United States Patent
Laramee

(10) Patent No.: US 12,304,289 B1
(45) Date of Patent: May 20, 2025

(54) SOLAR GLARE SHADE

(71) Applicant: Michelle Laramee, Smithfield, RI (US)

(72) Inventor: Michelle Laramee, Smithfield, RI (US)

(73) Assignee: RIOK Enterprises LLC, Smithfield, RI (US)

( * ) Notice: Subject to any disclaimer, the term of this patent is extended or adjusted under 35 U.S.C. 154(b) by 248 days.

(21) Appl. No.: 18/107,599

(22) Filed: Feb. 9, 2023

Related U.S. Application Data

(60) Provisional application No. 63/315,110, filed on Mar. 1, 2022.

(51) Int. Cl.
*B60J 3/02* (2006.01)

(52) U.S. Cl.
CPC .................................. *B60J 3/0213* (2013.01)

(58) Field of Classification Search
CPC ............................. B60J 3/0208; B60J 3/0213
USPC .................. 296/97.2, 97.7, 97.9; 160/DIG. 3
See application file for complete search history.

(56) References Cited

U.S. PATENT DOCUMENTS

| | | | |
|---|---|---|---|
| 4,958,879 A * | 9/1990 | Gillum | B60J 3/0204 160/370.21 |
| 6,227,600 B1 | 5/2001 | Chen | |
| 6,296,294 B1 * | 10/2001 | Kohnle | B60J 3/0208 296/97.9 |
| 6,513,855 B2 | 2/2003 | Zenisek | |
| D495,639 S * | 9/2004 | Sheridan | D12/191 |
| 6,938,942 B1 | 9/2005 | Ytterberg | |
| 7,014,244 B1 | 3/2006 | Baldwin | |
| 7,121,672 B1 * | 10/2006 | Swain | B60R 1/12 296/97.3 |
| 7,163,252 B1 | 1/2007 | Neault | |
| 8,287,025 B1 | 10/2012 | Bandola et al. | |
| 8,746,775 B2 | 6/2014 | Chino | |

* cited by examiner

*Primary Examiner* — Amy R Weisberg
*Assistant Examiner* — Denise Lynne Esquivel
(74) *Attorney, Agent, or Firm* — Salter & Michaelson

(57) ABSTRACT

A solar glare shade that is supported within a motor vehicle, and that is attached in a spaced relationship to an interior of a windshield of the motor vehicle by a support arm of the rear view mirror. The solar glare shade is formed of a planar solar reflecting panel that is constructed and arranged so as to reflect radiant sun rays away from the motor vehicle. The planar solar reflecting panel includes a linear top edge that is positioned to be in substantial alignment with a top surface of the motor vehicle windshield, a pair of mirror image arranged side edges, and a center opening connecting the respective pair of mirror image arranged side edges, the center opening having a partially circular edge for engagement with the support arm of the rear view mirror.

10 Claims, 2 Drawing Sheets

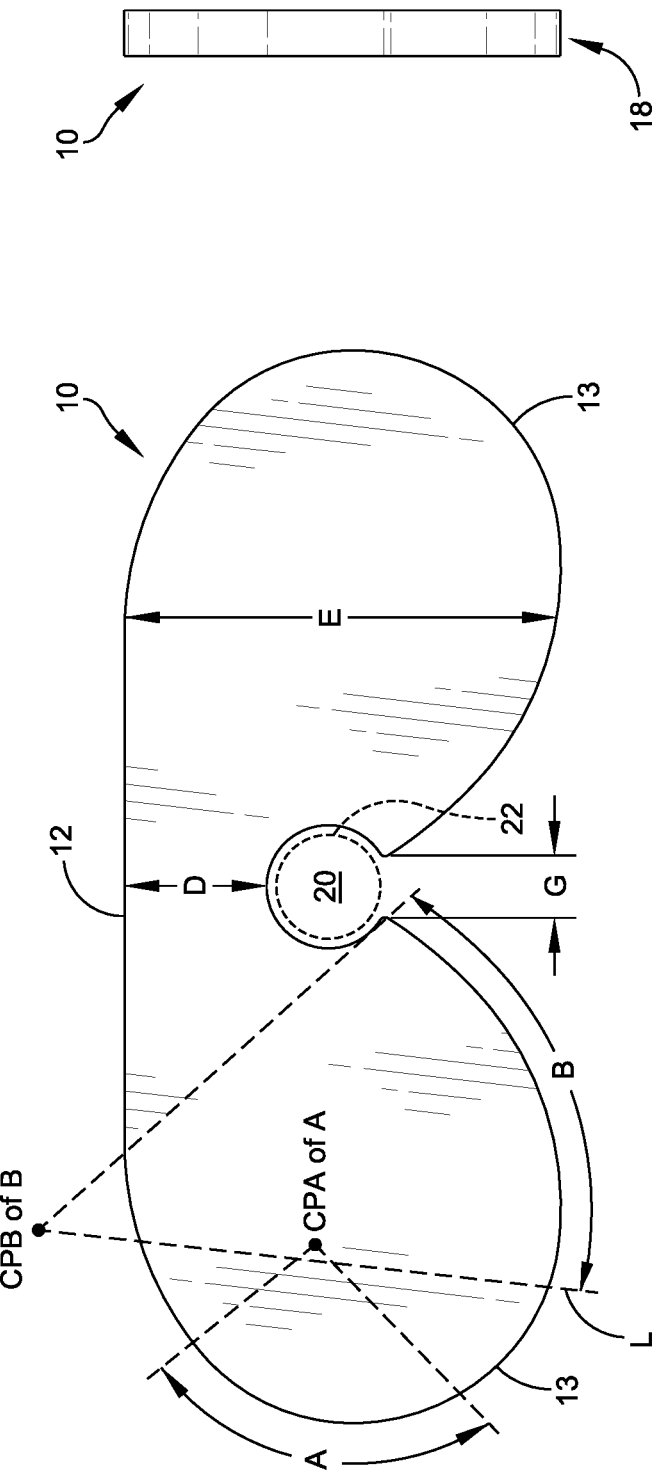

SOLAR GLARE SHADE

RELATED CASES

Priority for this application is hereby claimed under 35 U.S.C. § 119(e) to commonly owned U.S. Provisional Patent Application No. 63/315,110 which was filed on Mar. 1, 2022 and which is incorporated by reference herein in its entirety.

FIELD OF THE INVENTION

The present invention relates in general to a solar glare shade and pertains more particularly to a solar glare shade that is used and associated with the rear view mirror of a motor vehicle.

BACKGROUND OF THE INVENTION

Sun glare can occur without warning. Whether it is early dawn, high noon, or nearing sunset, the right angle and right placement of reflective surfaces can make solar glare a real problem. Visual impairments can lead to accidents. When the sun's rays shine down at the wrong time, a driver may be unable to see what they are doing. This makes it impossible for them to drive safely, as they have no idea what obstacles are around or where their vehicle is in relation to anything else. Though some drivers may think they can block the sun with their hand or dark glasses, this may not be effective all the time.

Accordingly, it is an object of the present invention to provide a solar glare mini shade that is adapted to be fit onto the interior automobile mirror bracket arm or post without obstructing any vision.

SUMMARY OF THE INVENTION

To accomplish the foregoing and other objectives of the present invention there is provide a solar glare shade that is supported within a motor vehicle, and that is attached in a spaced relationship to an interior of a windshield of the motor vehicle by a support arm of the rear view mirror. The solar glare shade is comprised of a planar solar reflecting panel that is constructed and arranged so as to reflect radiant sun rays away from the motor vehicle. The planar solar reflecting panel includes a linear top edge that is positioned to be in substantial alignment with a top surface of the motor vehicle windshield, a pair of mirror image arranged side edges, and a center opening connecting the respective pair of mirror image arranged side edges, the center opening having a partially circular edge for engagement with the support arm of the rear view mirror.

In accordance with other aspects of the present invention each of the pair of mirror image arranged side edges includes contiguous curved segments, each having a different radius of curvature; the contiguous curved segments include a first curved segment adjacent to the top edge and having a first radius of curvature, and a second curved segment adjacent to the central opening and having a second radius of curvature; the first radius of curvature is greater than the second radius of curvature; the center opening is circular about greater than 180 degrees and defines a center gap for receiving the support arm of the rear view mirror, and the center gap has a width that is smaller than a diameter of the support arm of the rear view mirror; the center opening is circular about greater than 180 degrees and defines a center gap for receiving the support arm of the rear view mirror; and the center gap has a width that is smaller than a diameter of the support arm of the rear view mirror so as to form a force fit between the center opening and the support arm of the rear view mirror.

In accordance with another embodiment the present invention there is provided a solar glare shade that is supported within a motor vehicle, and that is attached in a spaced relationship to an interior of a windshield of the motor vehicle by a support arm of the rear view mirror. The solar glare shade is comprised of a planar solar reflecting panel that is constructed and arranged so as to reflect radiant sun rays away from the motor vehicle. The planar solar reflecting panel includes a top edge, a pair of side edges, and a center opening connecting the respective pair of mirror image arranged side edges, the center opening having a partially circular edge for engagement with the support arm of the rear view mirror, and wherein the center opening is circular about greater than 180 degrees and defines a center gap for receiving the support arm of the rear view mirror.

In accordance with still other aspects of the present invention the top edge is linear and is positioned to be in substantial alignment with a top surface of the motor vehicle windshield; the pair of side edges are mirror images of each other; each of the pair of side edges includes contiguous curved segments, each having a different radius of curvature; the contiguous curved segments include a first curved segment adjacent to the top edge and having a first radius of curvature, and a second curved segment adjacent to the central opening and having a second radius of curvature; the first radius of curvature is greater than the second radius of curvature; the center gap has a width that is smaller than a diameter of the support arm of the rear view mirror; and the material of the planar solar reflecting panel is pliable so that the area thereof about the center opening can deflect in order to provide a force fit between the center opening and the support arm of the rear view mirror.

In accordance with still another embodiment the present invention there is provided a solar glare shade that is supported within a motor vehicle, and that is attached in a spaced relationship to an interior of a windshield of the motor vehicle at a support arm of the rear view mirror. The solar glare shade is comprised of a planar solar reflecting panel that is constructed and arranged so as to reflect radiant sun rays away from the motor vehicle. The planar solar reflecting panel includes a top edge, a pair of mirror image arranged side edges, and a center opening connecting the respective pair of mirror image arranged side edges, the center opening having a partially circular edge for engagement with the support arm of the rear view mirror, the pair of side edges being mirror images of each other, each of the pair of side edges includes contiguous curved segments, each having a different radius of curvature.

In accordance with still other aspects of the present invention the contiguous curved segments include a first curved segment adjacent to the top edge and having a first radius of curvature, and a second curved segment adjacent to the central opening and having a second radius of curvature; the first radius of curvature is greater than the second radius of curvature; the center gap has a width that is smaller than a diameter of the support arm of the rear view mirror; and the material of the planar solar reflecting panel is pliable so that the area thereof about the center opening can deflect in order to provide a force fit between the center opening and the support arm of the rear view mirror.

DRAWINGS

It should be understood that the drawings are provided for the purpose of illustration only and are not intended to define the limits of the disclosure. The foregoing and other objects and advantages of the embodiments described herein will become apparent with reference to the following detailed description when taken in conjunction with the accompanying drawings in which:

FIG. 1A is a front view of the solar glare shade of the present invention that includes an opening for mounting to the support post of a rearview mirror;

FIG. 1B is a side elevation view of the solar glare shade of the present invention as depicted in FIG. 1A;

DETAILED DESCRIPTION

Figure 2C:
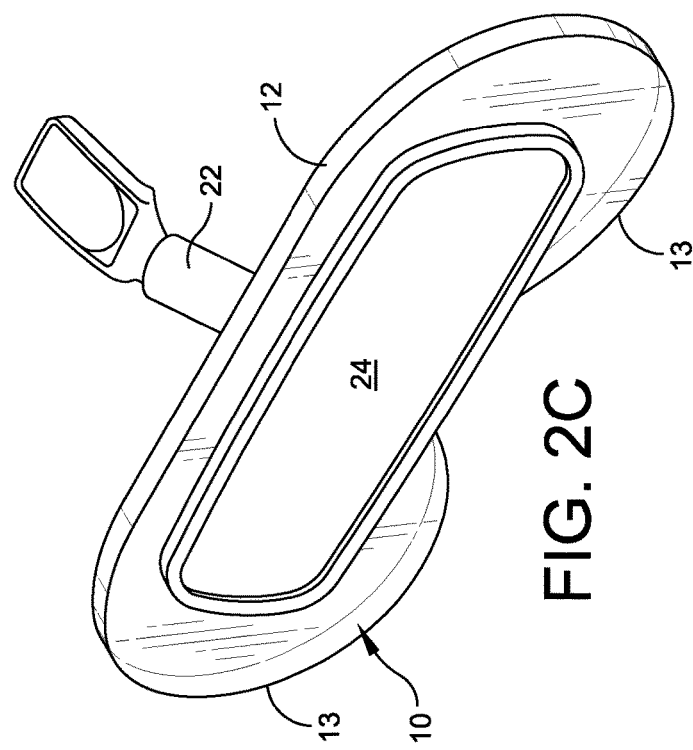
FIG. 2C is a front perspective view of the solar glare shade of the present invention as mounted to the support post of a rearview mirror.
Figure 2D:
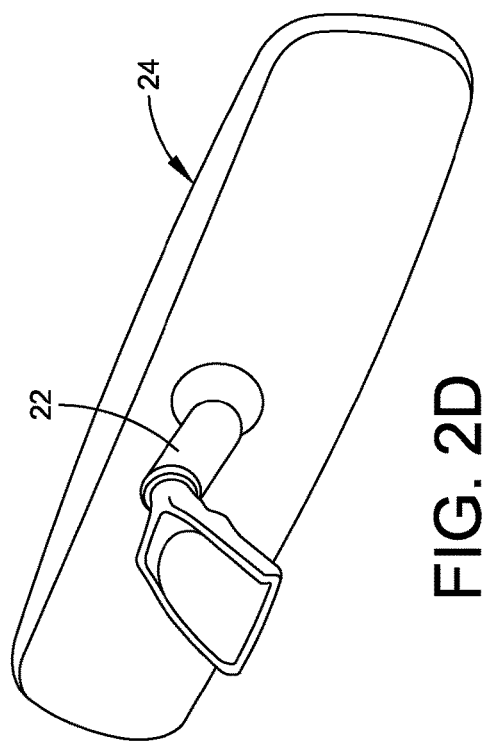
FIG. 2D is a rear perspective view of the rearview mirror showing the support arm or post for the rearview mirror.

Reference is now made to FIGS. 1A through 2D. FIG. 1A shows the shape of the shade 10 which includes a relatively flat top surface 12 of the shade 10. This flat top surface 12 is meant to fit flush with the top 14 of the windshield 16 of the vehicle. FIG. 1B shows a side view at 18. In FIG. 1A, in addition to the relatively flat top surface 12 there is a curved or arcuate surface 13 on the bottom that includes an opening 20. This opening 20 is meant to be disposed about the support post or arm 22 that supports the rearview mirror 24. The opening 20 is preferably circular as shown in FIG. 1. This circular shape is important in allowing some limited rotation of the shade 10 on the arm 22 in order to adjust the position of the shade 10. In FIG. 2A refer to the arrows X that depict this rotation feature.

Figure 2A:
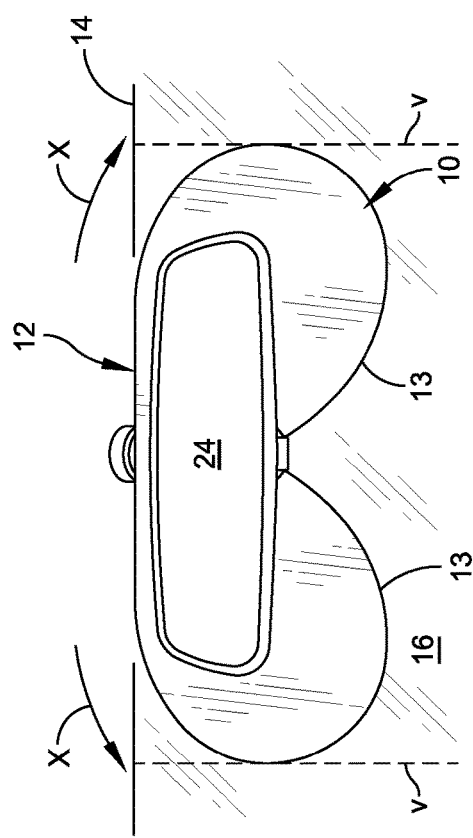
FIG. 2A is a front view of the solar glare shade of the present invention as mounted to the support post of a rearview mirror, and also showing the vehicle windshield.
Figure 2B:
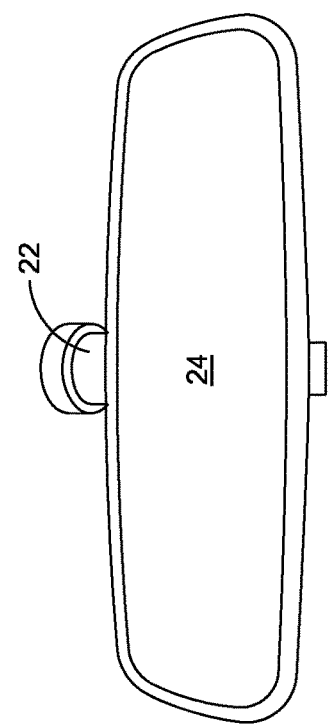
FIG. 2B is a front view of the rearview mirror as depicted in FIG. 1A.

FIGS. 2A-2D show is a series of views that include a first view of a typical mirror 24 having at a rear surface thereof an arm or post 22 that typically supports the mirror from an inner surface of the windshield 16. The shade 10 of the present invention is meant to be held about the arm 22 with the shade 10 positioned essentially behind the rear of the mirror 24 as shown in the illustrations in FIG. 2C. FIG. 2A illustrates by means of a series of arrows X the fact that the shade can be rotated for adjustment purposes. The shade can also be made specific to a particular vehicle so that the shade preferably is sized to be supported by the mirror arm or post 22 while also being positioned so the flat upper surface 12 sits essentially flush with the top 14 of the windshield 12.

Once again, the purpose of the solar shade of the present invention is to reduce glare into the vehicle. In particular, the shade is meant to fill the gap between the two visors that are provided in a vehicle. This is particularly important when there is no extender built into the visor to block out the sun's rays. In this regard refer to FIG. 2A that depicts an edge of the existing visor at the respective lines V.

The solar glare shade of the present invention is meant to be fit onto the interior rearview mirror arm or post without creating any obstruction for the driver of the vehicle. The shade itself is constructed of a flame retardant material such as a reflective aluminum polymer film that can reflect up to 97 percent of the radiant energy.

The shape of the shade, as particularly identified in FIG. 1A, is unique in that it relies upon a flat top surface 12 but a curved arcuate lower surface 13 that is formed with separate arcuate surface segments. These segments are illustrated in FIG. 1A by the distal arcuate surface segment A having a center of radius identified at CPA. Similarly, there is provided a proximal arcuate surface segment B that has a center of radius for segment B as identified at CPB. These two arcuate surface segments may be considered as meeting substantially at line L.

In FIG. 1A there is also illustrated a measurement D which is taken between the shade top surface 12 and the edge of the opening 20. This measurement D is at least as long as the diameter of the opening 20. FIG. 1A also illustrates the opening 20 having a gap G. This gap G provides a sufficient dimension so that the solar shade can be fit over the support post 22. Thus, the gap G is greater than the radius of the opening 20 by less than the diameter of the opening 20. FIG. 1A also illustrates the measurement E between the shade top surface 12 and the peak of the surface 13. The dimension E is preferably 2 to 3 times that of the dimension D. In FIG. 1A it is to be furthermore noted that the segments A and B exist on both sides of the shade but are only illustrated on one side. In that way the shade is symmetrical about a center line.

LIST OF REFERENCE NUMBERS 10 shade
12 shade top surface
13 curved or arcuate lower surface of the shade
14 top of windshield
16 windshield
20 opening in the lower surface of the shade
22 rear view mirror support post
24 rear view mirror
A distal arcuate surface segment
B proximal arcuate surface segment
CPA center of radius for segment A
CPB center of radius for segment B
D measurement between shade top surface 12 and the edge of the opening 20
E measurement between shade top surface 12 and the peak of the surface 13
G gap at the circular opening 20
L the transition line between surface segments A and B
V edge of the existing visor
X rotational arrow

Having now described a limited number of embodiments of the present invention, it should now be apparent to those skilled in the art that numerous other embodiments and modifications thereof are contemplated as falling within the scope of the present invention, as defined by the appended claims.

What is claimed is:

1. A solar glare shade that is supported within a motor vehicle, and that is attached in a spaced relationship to an interior of a windshield of the motor vehicle by a support arm of the ear view mirror, said solar glare shade comprised of a planar solar reflecting panel that is constructed and arranged so as to reflect radiant sun rays away from the motor vehicle, the planar solar reflecting panel including a top edge that is positioned to be in substantial alignment with a top surface of the motor vehicle windshield, a pair of mirror image arranged side edges, and a center opening connecting the respective pair of mirror image arranged side edges, the center opening having a partially circular edge for engagement with the support arm of the rear view mirror, wherein each of the pair of mirror image arranged side edges include curved segments A and B wherein the curved segments A and B are contiguous, the contiguous curved segments A and B include a first curved segment A commencing at the top edge and having a first radius of curvature, and a second curved segment B ending at the central opening and having a second radius of curvature.

2. The solar glare shade of claim 1 wherein the first radius of curvature is different than the second radius of curvature.

3. The solar glare shade of claim 2 wherein the second radius of curvature is greater than the first radius of curvature, the first radius of curvature has a center of radius CPA located within a locus of the planar solar reflecting panel and the second radius of curvature has a center of radius CPB located outside of the locus of the planar solar reflecting panel.

4. The solar glare shade of claim 3 wherein the center opening is circular about greater than 180 degrees and defines a center gap for receiving the support arm of the ear view mirror, and the center gap has a width that is smaller than a diameter of the support arm of the rear view mirror.

5. The solar glare shade of claim 1 wherein the center opening is circular about greater than 180 degrees and defines a center gap for receiving the support arm of the rear view mirror, and wherein the second radius of curvature is greater than the first radius of curvature.

6. The solar glare shade of claim 5 wherein the center gap has a width that is smaller than a diameter of the support arm of the rear view mirror so as to form a force fit between the center opening and the support arm of the ear view mirror.

7. A solar glare shade that is supported within a motor vehicle, and that is attached in a spaced relationship to an interior of a windshield of the motor vehicle at a support arm of the ear view mirror, said solar glare shade comprised of a planar solar reflecting panel that is constructed and arranged so as to reflect radiant sun rays away from the motor vehicle, the planar solar reflecting panel including a top edge, a pair of mirror image arranged side edges, and a center opening connecting the respective pair of mirror image arranged side edges, the center opening having a partially circular edge for engagement with the support arm of the rear view mirror, the pair of side edges being mirror images of each other, each of the pair of side edges includes contiguous curved segments, each having a different radius of curvature, wherein each of the pair of mirror image arranged side edges include curved segments A and B wherein the curved segments A and B are contiguous, the contiguous curved segments A and B include a first curved segment A commencing at the top edge and having a first radius of curvature, and a second curved segment B ending at the central opening and having a second radius of curvature, and wherein the second radius of curvature is greater than the first radius of curvature.

8. The solar glare shade of claim 7 wherein the first radius of curvature has a center of radius CPA located within a locus of the planar solar reflecting panel and the second radius of curvature has a center of radius CPB located outside of the locus of the planar solar reflecting panel.

9. The solar glare shade of claim 8 wherein the center opening is circular about greater than 180 degrees and defines a center gap for receiving the support arm of the rear view mirror and the center gap has a width that is smaller than a diameter of the support arm of the rear view mirror.

10. The solar glare shade of claim 9 wherein the material of the planar solar reflecting panel is pliable so that the area thereof about the center opening can deflect in order to provide a force fit between the center opening and the support arm of the ear view mirror.

\* \* \* \* \*